Jan. 17, 1956     F. G. BACK ET AL     2,730,926

CATADIOPTRIC TELEPHOTO OBJECTIVE SYSTEMS

Filed Aug. 25, 1954

FIG. 1

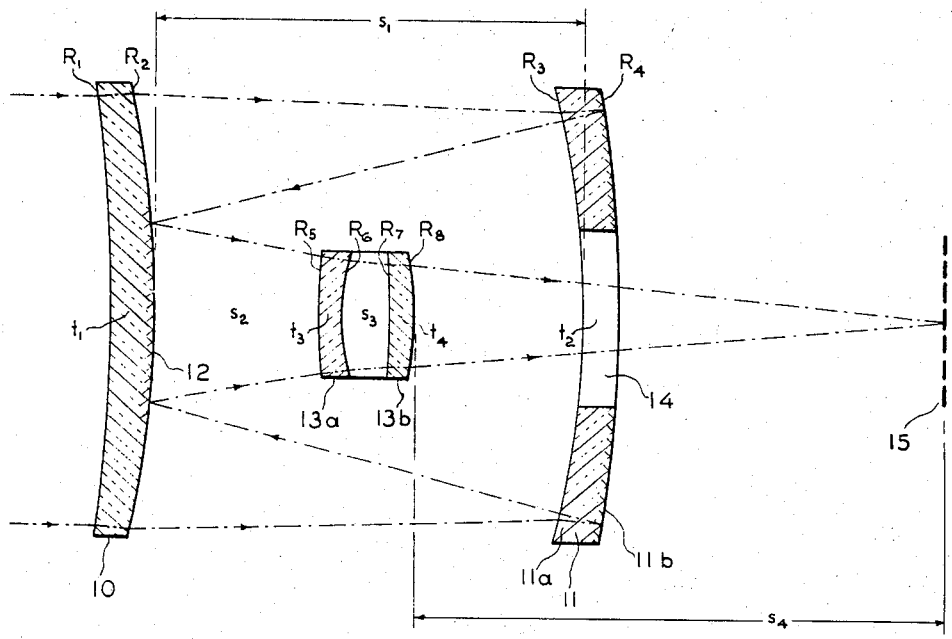

FIG. 2

| ELEMENT | GLASS | RADII | THICKNESS and SEPARATION |
|---|---|---|---|
| CORRECTION PLATE and SECONDARY MIRROR | Dense Flint $N_D=1.623$; $V=36.0$ | $R_1=-25.047''$ $R_2=-14.787''$ | $t_1=0.500''$ |
| | | | $s_1=4.200''$ |
| PRIMARY MIRROR | Borosilicate Crown $N_D=1.518$; $V=64.4$ | $R_3=-9.111''$ $R_4=-14.074''$ | $t_2=0.395''$ |
| | | | $s_2=1.500''$ |
| FIRST REAR ELEMENT | Borosilicate Crown $N_D=1.518$; $V=64.4$ | $R_5=+14.787''$ $R_6=+4.400''$ | $t_3=0.230''$ |
| | | | $s_3=0.500''$ |
| SECOND REAR ELEMENT | Dense Flint $N_D=1.620$; $V=36.3$ | $R_7=-32.165''$ $R_8=-8.661''$ | $t_4=0.250''$ |

Second Rear Element to Focal Plane     $s_4=5.507''$

Equivalent Focal Length = 20 inches

Relative Aperture = F : 5.6

$N_D$ = Index of Refraction for Yellow Light (5893Å)
V = Abbe's Dispersion Number
R = Radius of Curvature of Lens Surface

United States Patent Office 2,730,926
Patented Jan. 17, 1956

2,730,926
CATADIOPTRIC TELEPHOTO OBJECTIVE SYSTEMS

Frank Gerard Back and Herbert Lowen, Glen Cove, N. Y.

Application August 25, 1954, Serial No. 452,136

3 Claims. (Cl. 88—57)

The present invention relates to optical systems, and particularly to such systems as generically called catadioptric telephoto systems, which are used in connection with still-cameras, motion picture-cameras, television-cameras and all such other devices in which objectives with very long focal length are employed.

It is an object of the present invention to provide such objectives of long equivalent focal length, which have a high degree of correction for all aberrations over a large field, while at the same time the unit as such is of relatively short over-all length and light weight.

It is a further object of the present invention, to provide a new arrangement and novel construction for such objectives of long equivalent focal length wherein the flange focal distance is maintained sufficiently long so as to permit the use of reflex view finders and focusing devices with the said objectives despite the relatively short over-all length of the unit.

Conventional arrangements of this type of mirror-objectives when corrected for spherical aberration, tend to present the effect of a negative non-fulfillment of Abbe's sine condition when they are adequately corrected for spherical aberration. In lenses of low relative aperture (F:8 and less) these effects can be overcome by intentionally introducing spherical aberration in order to fulfill Abbe's sine condition. This spherical aberration is not objectionable at a speed of F:8 or less. However, at speeds greater than F:8 spherical aberrations cannot be tolerated and accordingly the necessary corrections must both eliminate spherical aberration and the effect of non-fulfillment of Abbe's sine condition.

The efficient accomplishment of such dual correction for both fulfillment of Abbe's sine condition and for spherical correction is a further object of the present invention.

Other advantages and objects of the present invention will be obvious on hand of the detailed description of a preferred example embodying the invention, and illustrated in the accompanying drawings.

It will be understood that for the purpose of adequate and complete description of all the features of the present invention, a preferred example has been illustrated without thereby limiting the scope of the present invention, except as limited by the prior art and the scope of the appended claims:

In the drawings—

Fig. 1 is a schematic cross-sectional view of one embodiment of the present invention and shows a lens of 20" equivalent focal length.

Fig. 2 is a table of data as they apply to the 20" catadioptric telephoto system, illustrated in Fig. 1.

Telephoto lenses commonly consist of a positive front component and a negative rear component. Having now reference to Fig. 1, it will be seen that the positive front component of a telephoto system constructed in accordance with the present invention consists of a correction plate 10, of positive power, a meniscus lens-mirror combination 11 which consists of the refracting member 11a and the reflecting rear surface 11b of said refracting member. The reflecting member 11b serves as the primary mirror of the positive front component. The center rear portion of the convex side of the correction plate 10 is mirrored and forms the secondary mirror of the positive front component. The negative rear component may be constituted of any lens combination of combined negative power such as negative lens 13a and positive lens 13b.

The ray-path in the catadioptric telephoto system illustrated in Fig. 1 is as follows:

The image forming axial parallel rays pass from the object through the correction plate 10 which is of positive power; thence onto the meniscus lens mirror combination 11 by passing through the refracting member 11a and impinging upon the spherical, concave, primary mirror of the system's positive front component, which is formed by the mirrored rear surface 11b of the meniscus lens; thence the rays are reflected by said primary concave mirror onto the secondary convex mirror 12 of the system which is formed by the mirrored, convex, rear center area of the convex side of the correction plate 10; thence the rays are reflected by the secondary convex mirror 12 in such manner that the pass through the negative rear component of the telephoto system by traversing the negative lens 13a and the positive lens 13b which are of a combined negative power; thence the rays pass through the aperture 14 provided within the center portion of the meniscus lens mirror combination 11 onto the focal plane 15.

Having now reference to Figs. 1 and Fig. 2, it will be seen that Fig. 1 represents a catadioptric telephoto system which has an equivalent focal length of 20" and a relative aperture of a speed F:5.6. The values for the components of a catadioptric telephoto system as illustrated in Fig. 1, are as follows:

| Element | Glass | Radii | Thickness | Separation |
|---|---|---|---|---|
| Correction Plate 10, Secondary Mirror 12 | DF $N_D=1.62.3$ $V=36.0$ | $R_1=-25.047''$ $R_2=-14.787''$ | $t_1=.500''$ | $s_1=4.200''$ |
| Meniscus Lens, Primary Mirror 11 | BSC $N_D=1.518$ $V=64.4$ | $R_3=-9.111''$ $R_4=-14.074''$ | $t_2=.395''$ | $s_2=1.500''$ |
| First Rear Element 13a | BSC $N_D=1.518$ $V=64.4$ | $R_5=+14.787''$ $R_6=+4.400''$ | $t_3=.230''$ | $s_3=.500''$ |
| Second Rear Element 13b | DF $N_D=1.620$ $V=36.3$ | $R_7=-32.165''$ $R_8=-8.661''$ | $t_4=.250''$ | |
| Second Rear Element to Focal Plane | | | | $s_4=5.507''$ |

Equivalent focal length 20".
Relative aperture F/5.6.
$N_D$ = Index of refraction for yellow light (5893A.).
V = Abbe's dispersion number.
R = Radius of curvature of lens surface.
BSC = Boro silicate crown.
DF = Dense flint.

It will be obvious from the foregoing detailed description of one of the preferred examples of the present invention that the achievement of an improved catadioptric telephoto lens construction is, according to the present invention, accomplished by employing mirror elements in the positive front component and a combination of a reflecting and a refracting element to serve as the primary mirror of the positive front component of the system. The use of a meniscus lens, the rear surface of which is mirrored and reflecting, as primary mirror constitutes an optical means which both reflects and refracts and thus actually may affect an impinging ray three times.

It is obvious that various modifications may be made in the choice of elements, their design and selection by those skilled in the art, without thereby departing from the scope of the present invention, the example having only been specifically detailed to adequately set forth and describe our invention.

Having set forth our invention what we desire to claim and secure by Letters Patent is:

1. In a catadioptric telephoto lens system, a positive, meniscus shaped, positive corrector element concave toward the object space, the center portion of the convex rear-surface thereof adapted to form the secondary mirror of the system, a rear-surface spherical meniscus lens primary mirror positioned behind said corrector plate and said secondary mirror, the front surface of said corrector element having a negative power, said correcting element and said primary mirror forming in combination a substantially corrected positive front component, and a positive lens and a negative lens in spaced axial alignment and of combined negative power forming the negative rear-element of said catadioptric telephoto lens, whereby an image is focused by said lens system at a point behind the rear surface of said primary mirror.

2. In a catadioptric telephoto lens in accordance with claim 1, a positive meniscus shaped corrector plate concave toward the object space, the center portion of the convex rear thereof adapted to form the secondary mirror of the system wherein the dioptric power of said corrector plate is at least ¼ but not more than ¾ of the total power of the whole system and where the absolute value of the negative catoptric power of said convex rear surface is not less than 2 times but not more than 4 times the total power of the system, a rear surface primary mirror at a distance of not less than ⅛ nor more than ¼ of the focal length of the whole system behind said corrector plate and secondary mirror, the front surface of said primary mirror having a negative dioptric power at least ¾ but not more than 2 times the absolute power of the whole system, the silvered rear surface of said primary mirror having a catoptric power of not less than 2 times nor more than 4 times the total power of the whole system said primary mirror having a total positive power of not less than 1½ times nor more than 3 times the power of the total system, said elements forming in combination a substantially corrected positive front component and a positive and negative lens of a combined negative power of at least ¼, but not more than ¾ of the absolute power of the total system positioned at least ½₀ but not more than ⅒ of the total focal length of the system behind the rear surface of said corrector plate and secondary mirror and forming the negative rear element of said telephoto lens.

3. In a catadioptric telephoto system in accordance with claim 1 a lens arrangement comprising:

| Element | Glass | Radii | Thickness and Separation |
|---|---|---|---|
| Correction Plate 10, Secondary Mirror 12 | DF $N_D=1.621$ $V=36.2$ | $R_1=-25.047''$ $R_2=-14.787''$ | $t_1=.500''$ $s_1=4.200''$ |
| Meniscus Lens, Primary Mirror 11 | BSC $N_D=1.517$ $V=64.4$ | $R_3=-9.111''$ $R_4=-14.074''$ | $t_2=.395''$ $s_2=1.500''$ |
| First Rear Element 13a | BSC $N_D=1.517$ $V=64.4$ | $R_5=+14.787''$ $R_6=+4.400''$ | $t_3=.230''$ $s_3=.500''$ |
| Second Rear Element 13b | DF $N_D=1.621$ $V=36.2$ | $R_7=-32.165''$ $R_8=-8.661''$ | $t_4=.250''$ |
| Second Rear Element to Focal Plane | | | $s_4=5.507''$ |

Wherein the equivalent focal length is 20'';
The relative aperture is f/5.6; and
$N_D$=Index of refraction for Yellow Light (.5893A).
V=Abbe's dispersion number.
R=Radius of curvature of lens surface.
BSC=Boro silicate crown.
DF=Dense flint.
T=Thickness of lens.
S=Air space between elements.

References Cited in the file of this patent

UNITED STATES PATENTS

| | | |
|---|---|---|
| 2,239,538 | Richter | Apr. 22, 1941 |
| 2,504,383 | Bouwers | Apr. 18, 1950 |
| 2,701,983 | Back et al. | Feb. 15, 1955 |

FOREIGN PATENTS

| | | |
|---|---|---|
| 724,026 | Germany | Aug. 15, 1942 |
| 824,558 | Germany | Dec. 13, 1951 |
| 969,797 | France | May 31, 1950 |

OTHER REFERENCES

Maksutov: Article, "New Catadioptric Meniscus Systems," pages 270–284, Journal Optical Society of America. vol. 34, No. 5, May 1944, pages 278 and 279 cited.